(12) United States Patent
Schellati

(10) Patent No.: US 10,981,176 B2
(45) Date of Patent: *Apr. 20, 2021

(54) METHOD OF SORTING TRASH FOR RECYCLING OF PAPER AND APPARATUS FOR SORTING TRASH FOR PAPER RECYCLING

(71) Applicant: Van Dyk Baler Corp., Stamford, CT (US)

(72) Inventor: Brian Schellati, Irvington, NY (US)

(73) Assignee: VAN DYK BALER CORP., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,614

(22) Filed: Nov. 13, 2019

(65) Prior Publication Data

US 2020/0078793 A1 Mar. 12, 2020

Related U.S. Application Data

(63) Continuation of application No. 15/903,318, filed on Feb. 23, 2018, now Pat. No. 10,507,470.

(Continued)

(51) Int. Cl.

| | |
|---|---|
| *B02C 19/18* | (2006.01) |
| *F23G 5/02* | (2006.01) |
| *F23G 5/00* | (2006.01) |
| *F23G 5/46* | (2006.01) |
| *B65F 1/14* | (2006.01) |
| *B03B 9/06* | (2006.01) |

(52) U.S. Cl.
CPC ............. *B02C 19/186* (2013.01); *B03B 9/06* (2013.01); *B65F 1/1426* (2013.01); *F23G 5/006* (2013.01); *F23G 5/02* (2013.01); *F23G 5/46* (2013.01); *F23G 2201/10* (2013.01); *F23G 2201/40* (2013.01); *F23G 2201/602* (2013.01); *F23G 2201/603* (2013.01)

(58) Field of Classification Search
CPC ....... B02C 19/186; B03B 9/06; B65F 1/1426; F23G 5/006; F23G 5/02; F23G 5/46
USPC .......................................................... 209/2
See application file for complete search history.

(56) References Cited

U.S. PATENT DOCUMENTS

| | | | | |
|---|---|---|---|---|
| 3,456,360 A | * | 7/1969 | Terakawa | F26B 3/08 34/591 |
| 3,524,594 A | * | 8/1970 | Anderson | B03B 9/06 53/428 |

(Continued)

*Primary Examiner* — Terrell H Matthews
(74) *Attorney, Agent, or Firm* — Buchanan Ingersoll & Rooney PC

(57) ABSTRACT

Methods and apparatuses can be configured to facilitate sorting of paper from garbage and/or single stream recycling and subsequently process that separated paper to remove the contaminants from the paper so that the paper is in an acceptable condition for recycling. In some embodiments, the apparatus and method may utilize at least one dryer device that is configured to heat the paper without combusting the paper to remove water from the paper. The dryer device can also be configured to mix the paper as it is dried while also removing particulate contaminants off of the paper to clean the thrown away paper sufficiently so that the paper is in a condition that is acceptable for recycling into a paper product (e.g. a cardboard box, paper plate, sheets of paper, etc.).

20 Claims, 4 Drawing Sheets

Related U.S. Application Data

(60) Provisional application No. 62/464,536, filed on Feb. 28, 2017.

(56) References Cited

U.S. PATENT DOCUMENTS

| | | | | |
|---|---|---|---|---|
| 4,034,862 A * | 7/1977 | Bahri | ............... | B04C 9/00 209/11 |
| 5,060,870 A * | 10/1991 | Trezek | ............... | B29B 17/02 241/19 |
| 5,205,417 A | 4/1993 | Herren | | |
| 5,339,980 A | 8/1994 | Stutler | | |
| 5,465,504 A * | 11/1995 | Joiner | ............... | D21F 5/044 34/111 |
| 5,524,771 A * | 6/1996 | Kairi | ............... | B07C 5/34 209/518 |
| 5,557,873 A * | 9/1996 | Lynam | ............... | F26B 1/00 34/379 |
| 6,463,674 B1 * | 10/2002 | Meyers | ............... | B41J 11/002 34/304 |
| 7,660,724 B2 | 2/2010 | Mallett et al. | | |
| 2003/0173433 A1 * | 9/2003 | Okamura | ............... | B03B 9/061 241/79 |
| 2004/0031732 A1 | 2/2004 | Whitnable | | |
| 2005/0080520 A1 | 4/2005 | Kline et al. | | |
| 2006/0081513 A1 * | 4/2006 | Kenny | ............... | B03B 9/06 209/672 |
| 2006/0178933 A1 | 8/2006 | FitzGerald et al. | | |
| 2006/0218812 A1 * | 10/2006 | Brown | ............... | D06F 58/20 34/86 |
| 2007/0185612 A1 | 8/2007 | Stevens et al. | | |
| 2007/0260466 A1 | 11/2007 | Casella et al. | | |
| 2008/0172298 A1 | 7/2008 | Gonen | | |
| 2009/0008298 A1 | 1/2009 | Studley | | |
| 2009/0036720 A1 | 2/2009 | Carner | | |
| 2010/0185506 A1 | 7/2010 | Wolff et al. | | |
| 2011/0238598 A1 | 9/2011 | Borowski et al. | | |
| 2018/0243751 A1 * | 8/2018 | Schellati | ............... | B03B 9/06 |

* cited by examiner

Open and liberate bags of mixed waste that includes paper and other garbage and reduce the size of this material.

Separate mixed waste by size.

Remove ferrous and non-ferrous metals from the smaller waste and remove ferrous and non-ferrous metals from the larger waste.

Separate heavy materials from lightweight materials that include paper from the smaller waste.

Sort lightweight materials to separate fiber materials that include the paper from plastic materials from the smaller waste.

Optionally, may mix larger paper waste previously sorted from lighter weight paper waste for feeding the mixed paper waste to a dryer.

Dry the waste paper separated from the garbage (e.g. at least the lightweight and smaller sized paper that is expected to have the most moisture and contaminants) to remove moisture and small contamination adhered to the paper and/or absorbed to the paper (e.g. grit, dust, dirt, grime, etc.) until the paper has a moisture level within an acceptable pre-selected moisture range (e.g. 20% or below 20% moisture content). Heat from exhaust gas from generator operations and/or other plant process(es) can be fed to the dryer to use the heat from one or more flows of hot gas to heat the paper in the dryer. A heat exchanger can also be configured to extract heat from another plant process for providing a hot gas flow to the dryer for the drying operations.

Output the dried (and at least partially cleaned) paper for subsequent baling and distribution.

FIG. 2

METHOD OF SORTING TRASH FOR RECYCLING OF PAPER AND APPARATUS FOR SORTING TRASH FOR PAPER RECYCLING

CROSS-REFERENCE TO RELATED APPLICATIONS

The present application is a continuation application of U.S. patent application Ser. No. 15/903,318, which claims priority to U.S. Provisional Patent Application No. 62/464,536, filed on Feb. 28, 2017. The entirety of this provisional patent application is incorporated by reference herein.

FIELD OF THE INVENTION

The present innovation relates to garbage handling, sorting of garbage, and devices used to sort garbage and recycle materials that are included within garbage.

BACKGROUND OF THE INVENTION

Trash, which is also referred to as garbage, is often collected at residential and commercial locations and subsequently sent to a processing plant. At the processing plant, the trash may be sorted for disposal. Recycling materials collected for recycling may also be collected at residential and commercial locations and subsequently sent to a processing plant for sorting of the recyclable materials for distribution of those materials for recycling. These recycling materials are often stored prior to collection separately from other garbage so that the collection of the recycling materials only has the recycling materials mixed with each other without a significant presence of garbage.

Typically, processing plants that receive collected trash or garbage are not configured to facilitate the sorting of trash so that paper products can be separated from the trash and subsequently recycled. Typically, grime and other contaminants the paper is exposed to while with the trash makes the paper unsuitable for recycling. Thus, paper mixed within other garbage is often not recycled due to it being thrown away with other garbage (e.g. uneaten food, rotting produce, grimy materials, etc.). Such thrown away paper that is mixed with garbage can include, for example, paper napkins, paper towels, paper plates, paper cups, cardboard, newspaper, office paper, and other types of paper products that may be thrown away into a general trash collection receptacle that collects other types of garbage for disposal.

SUMMARY OF THE INVENTION

I determined that a new method and apparatus of sorting trash for paper recycling was needed as I have determined that a significant amount of the paper thrown away and mixed with other garbage can be considered good recycling paper fiber that can be suitable for recycling if that paper can be suitably cleaned and dried. Embodiments of my new method and apparatus can be configured to facilitate sorting of paper from garbage and subsequently processing that separated paper to remove the contaminants from the paper so that the paper is in an acceptable condition for subsequent recycling. In some embodiments, the apparatus and method may utilize at least one dryer device that is configured to heat the paper without combusting the paper to remove water from the paper. The dryer device can also be configured to mix the paper as it is dried while also removing particulate contaminants off of the paper to clean the thrown away paper sufficiently so that the paper is in a condition that is acceptable for recycling into a paper product (e.g. a cardboard box, paper plate, sheets of paper, etc.).

For instance, embodiments of an apparatus can be configured as a garbage processing apparatus that includes at least one sorter configured to sort paper from garbage fed to the sorter where the paper has a moisture content that is above a pre-selected threshold and at least one dryer configured to receive the paper sorted from the garbage to heat the paper to reduce the moisture content of the paper to being at or below the pre-selected threshold.

In some embodiments, the apparatus can be configured as a garbage processing plant. Other embodiments of the apparatus can be configured as another type of facility.

The dryer can be configured to do more than just heat the paper. For instance, the dryer can be configured clean the paper as the paper is heated therein. In some embodiments, the dryer can include at least one arm that is moveable within a chamber of the dryer to agitate the paper as it is heated.

The dryer can be heated via hot air passed into a chamber of the dryer in which the paper is fed. The hot air fed to the dryer can be hot air from at least one generator apparatus. The dryer can be connected to at least one generator apparatus to receive exhaust gas from the generator apparatus to heat the paper (e.g. exhaust from a combustor, etc.).

The pre-selected moisture threshold for the paper can be a moisture content value that meets a particular set of design criteria. For instance, the threshold can be a 20% moisture content measured on a dry basis or measured on a wet basis. As another example, the moisture content could be less than 20% such as an 18%, 15% or 12% moisture threshold.

Embodiments of a method of sorting trash for recycling paper within the trash can include separating paper from garbage and subsequently drying the paper so that a moisture content of the paper is below a pre-selected threshold, the paper being cleaned as it is dried. For instance, embodiments of the method can be performed so that the drying of the paper also removes contaminants adhered to the paper and/or absorbed in the paper.

Embodiments of the method can also include other steps. For instance, the method can also include baling the paper after it is dried and applying at least one magnetic field to the garbage to separate magnetic materials for sorting and distribution of those materials. As another example, embodiments of the method can also include at least one of: feeding exhaust gas from at least one plant process to the dryer for use in heating the paper for drying the paper, utilizing multiple screen separators to separate the garbage and paper mixed therein into different flows of garbage having different size ranges, removing plastic materials from the garbage with paper mixed therein, removing metal materials from the garbage with the paper mixed therein, separating the paper from the garbage for feeding the separated paper to a dryer, and feeding the separated paper to the dryer.

In some embodiments of the method, the drying of the paper can be performed via a dryer. For instance, the drying can be performed in a dryer having at least one rotatable shaft connected to a plurality of arms that move within a chamber of the dryer for agitating the paper within the chamber while the paper is heated for drying the paper. Some embodiments of the dryer can have a grate. The grate can have holes through which hot air passes into the chamber for heating the paper and dirt that is removed from the paper passes for exiting the chamber of the dryer.

The drying of the paper can be performed at a number of different temperatures or temperature ranges and at different pressures. For instance, the drying of the paper can be performed at a temperature that is no greater than 400° F. (204.44° C.) and atmospheric pressure (e.g. one atmosphere, 14.7 psi, etc.). As another example, the drying of the paper can be performed at a temperature that between 250° F.-400° F. (121.11° C.-204.44° C.). Of course, other temperature ranges could be used for the drying such as 120° C.-200° C. (+/−5° C.), 225° F.-375° F., etc. The pressure at which the dryer operates for drying of the paper can also be other pressures. The selected pressure and temperature operational ranges can be selected for meeting a particular set of design criteria while also being set to ensuring that the paper being dried will not be heated so much that the paper will combust so that burning of the paper can be avoided.

Other details, objects, and advantages of the apparatus for sorting trash for paper recycling and methods of making and using the same will become apparent as the following description of certain exemplary embodiments thereof proceeds.

BRIEF DESCRIPTION OF THE DRAWINGS

Exemplary embodiments of an apparatus for sorting trash for paper recycling and methods of making and using the same are shown in the drawings included herewith. It should be understood that like reference numbers used in the drawings may identify like components.

FIG. 2 is a flow chart illustrating a first exemplary embodiment of a method for sorting trash for paper recycling. An optional step of the first exemplary embodiment of the method illustrated in FIG. 1 is shown in broken line.

DETAILED DESCRIPTION OF EXEMPLARY EMBODIMENTS

Figure 1:
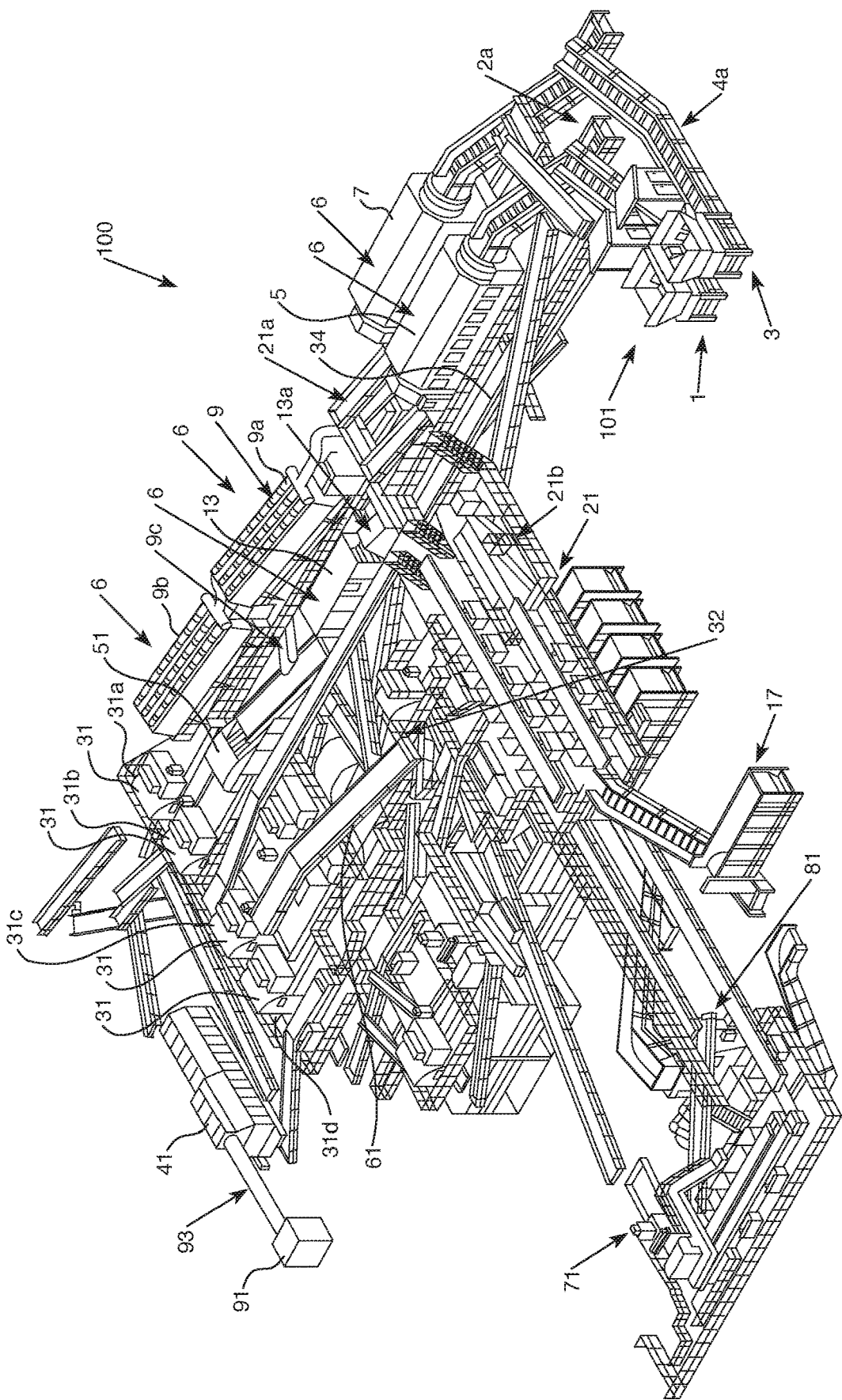
FIG. 1 is an isometric view of a first exemplary embodiment of an apparatus for sorting trash for paper recycling.

An embodiment of an apparatus for sorting trash for paper recycling 100 and embodiments of methods of using such an apparatus 100 can be appreciated from FIGS. 1-5. In some embodiments, the apparatus 100 can be configured as a processing plant or waste and recycling distribution facility. The apparatus can be configured to receive waste materials collected by garbage trucks from residential, industrial, and/or commercial properties (e.g. residential homes, offices, factories, etc.) to sort the trash and distribute those waste materials for further processing and/or re-use. The apparatus 100 can also be configured to process curbside recyclables (e.g. single stream recycling materials) that may be received from a recyclables vehicle that collects recycling material from residential, industrial and/or commercial locations.

In some embodiments, the trash that is collected from garbage transportation vehicles can be sent from a collection apparatus to a bag opener and/or size reducer assembly 101. This assembly can include a first size reducer bin assembly 1 for collecting the residential waste that has been received and a second size reducer bin assembly 3 for collecting the commercial waste that has been received at the apparatus. Each size reducer bin assembly can be configured to open trash bags to liberate waste collected therein and contact the waste to reduce the size of the waste. The size reducers may include at least one crushing mechanism, grinding mechanism, cutting mechanism, vibrating mechanism, and/or shredding mechanism that may contact the waste to cut open the trash bags and contact the waste to reduce the size of the waste. In other embodiments, the size reducers may utilize some other type of comminution mechanism or a comminution mechanism that includes a combination of at least two of a crushing mechanism, a grinding mechanism, a cutting mechanism, a vibrating mechanism, and/or a shredding mechanism.

After the waste material that has been collected is reduced in size to a first size range, the material may be fed to size separation mechanisms 6, which can be configured as screen separator devices such as trommel screen devices, rotary screen devices, or other type of separator devices that are configured to separate the materials fed as a feed flow of material therein so that the feed flow of material is separated into at least one first output flow having a second size range (e.g. under 14 inches (in.) in size, under 35.56 centimeters (cm) in size, under than or equal to 14 in. under than or equal to 35.56 cm, etc.) and at least one second output flow having a third size range that is larger than the second size range (greater than 14 in. greater than or equal to 14 in., greater than 35.56 cm, greater than or equal to 35.56 cm, etc.).

For instance, the collected residential waste material may be reduced in size by the first size reducer bin assembly 1 and fed to a first screen separator device 5 via a first feed conveyor assembly 2a. The collected commercial waste material may be reduced in size by a second size reducer assembly 3 and subsequently fed to a second screen separate device 7 via a second feed conveyor assembly 4a. The smaller sized material that is within a second size range, such as a size range that is less than 14 inches (35.56 cm) or equal to and under 14 inches (35.56 cm), can be separated from the larger material that is within a third size range that is greater than the second size range.

The larger material can be output from the larger openings of the first and second screen separator devices 5 and 7 onto a large material sort line feed conveyor assembly 21a for feeding the larger material within the third size range to a large material sort line 21 in which the larger material can be sorted into different types of garbage for subsequent processing. The large material sort line 21 can be configured so that personnel may manually sort the larger trash. The personnel may work in combination with other devices to facilitate sorting of the larger material.

The smaller material in the second size range may be output from the bottom openings of the first and second screen separator devices 5 and 7 for subsequent movement of the smaller material. For the first screen separator device 5, which may receive the residential waste flow of material from the first size reducer bin assembly 1, the separated smaller waste material within the second size range may be transported to a third separator device 13 via a third separator feed conveyor assembly 13a. The third separator device 13 can be configured to separate waste that is within the second size range fed therein into a first output flow of separated waste material in a fourth size range (e.g. below 5 in. or equal to or under 5 in. in size, or equal to or under 12.7 cm in size, below 12.7 cm in size, etc.) and a fifth size range (e.g. greater than or equal to 5 in. in size but less than or equal to 14 in. in size, greater than or equal to 12.7 cm in size, greater than or equal to 12.7 cm in size and less than or equal to 35.56 cm in size, etc.). The larger material output from the third separator device 13 that is within the fifth size range can be fed to an optical sorter 51 configured to sort material within a pre-selected size range between the fifth size range and the third size range (e.g. greater than 5 in. but less than 14 in., greater than or equal to 12.7 cm but less than or equal to 35.56 cm, etc.). The smaller material within the fourth size range that is output from the third separator 13 can be conveyed to a paper sorter 31 via a paper sorter feed conveyer assembly 32 that conveys material from the third separator device 13 to a paper sorter 31 for separating paper from the non-paper material within the material within the fourth size range that is output from the third separator device 13.

Prior to being conveyed to the paper sorter 31, the material within the fourth size range may be separated by size at least one more time via another separation mechanism of the third separator device 13 (e.g. trommel screen separator, air separator, etc.) so that the smaller material in the fourth size range is separated into material within a sixth size range (e.g. less than 2 in., material less than 5.08 cm, material that is less than or equal to 2 in., material that is less than or equal to 5.08 cm, etc.) and a seventh size range (greater than 2 in., greater than 5.08 cm, greater than or equal to 5.08 cm and less than or equal to 12.7 cm, less than or equal to 5 in. but greater than or equal to 2 in., etc.). The material in the smallest sixth size range may be considered unrecyclable waste and transported for disposal to a landfill, incineration device, or other waste disposal process. The material in the larger seventh size range, which can also be within the fourth size range, may be fed to a paper sorter 31.

The paper sorter 31 can be configured to utilize one or more sensors (e.g. at least one optical sensor such as at least one near-infrared (NIR) sensor, near-infrared spectrometer (NIRS) or other type of optical sensor and/or other type of sensor) for the sorting of paper from other materials within the output flow of material within the fifth size range or the seventh size range output from the third separator device 13 so that the paper within that flow of material is separated from the non-paper materials within the flow of garbage passed through the third separation device 13.

For the second screen separator device 7, which may receive the commercial waste flow of material from the second size reducer bin assembly 3, the separated smaller waste material within the second size range may be transported to a fourth separator device 9 that may be configured to separate waste that is within the second size range fed therein into a first output flow of separated waste material in a fourth size range (e.g. below 5 in. or equal to or under 5 in. in size, equal to or under 12.7 cm in size, or under 12.7 cm in size, etc.) and a fifth size range (e.g. greater than or equal to 5 in. in size but less than or equal to 14 in. in size, greater than to 12.7 cm in size, greater than 12.7 cm in size and less than 35.56 cm in size, greater than 12.7 cm in size, etc.). The fourth separator device 9 can be configured to include a first air separation mechanism 9a or may be configured to include multiple air separation mechanisms such as a first air separation mechanism 9a and a second air separation mechanism 9b that may be arranged in series to separate the material into the first output flow having the fourth size range and a second output flow in the fifth size range. The larger second output flow in the fifth size range can be collected from bottom openings of the first and second air separation mechanisms 9a and 9b through which the larger, heavier material may have fallen as it was passed through the first and second air separation mechanisms for depositing that material onto an optical sorter feed conveyor 9c for feeding that material to the optical sorter 51 configured to sort material within a pre-selected size range between the fifth size range and the third size range (e.g. greater than 5 in. but less than 14 in., greater than or equal to 12.7 cm but less than or equal to 35.56 cm, etc.). The material fed to the optical sorter 51 from the fourth separation device 9 may be mixed with the material fed to the optical sorter 51 from the third separation device 13 prior to the optical sorter 51 sorting the material.

The first output flow of the smaller material within the fourth size range that is output from fourth separation device 9 (e.g. an output of the last of the air separation mechanisms that may be arranged in series, the output of the second air separation mechanism 9b, etc.) can be fed to a first paper sorter 31a that is configured as a paper sorting device 31. The first paper sorter 31a can be configured to utilize one or more sensors (e.g. at least one optical sensor and/or other type of sensor) for the sorting of paper from other materials within the first output flow of material within the fourth size range output from the fourth separator device 9 so that the paper within that flow of material is separated from the non-paper materials within the flow of garbage passed through the fourth separation device 9.

Prior to being conveyed to the paper sorter 31, the material within the fourth size range may be separated by size at least one more time via another separation mechanism of the fourth separation device 9 (e.g. trommel screen separator, another air separator, another stage in the second air separator 9b, etc.) so that the smaller material in the fourth size range is separated into material within the sixth size range (e.g. less than 2 in., material less than 5.08 cm, less than or equal to 2 in., less than or equal to 5.08 cm, etc.) and the seventh size range (greater than 2 in., greater than 5.08 cm, greater than or equal to 5.08 cm and less than or equal to 12.7 cm, greater than or equal to 5 in. but greater than 2 in., etc.). The material in the smallest sixth size range may be considered unrecyclable waste and transported for disposal to a landfill, incineration device, or other waste disposal process. The material in the larger seventh size range (which can also be within the fourth size range) may be fed to a paper sorter 31.

The material fed to the optical sorter 51 can be sorted by the optical sorter 51 so that paper-like materials such as film-type materials, sheet-shaped materials, and other materials detected as fitting within a pre-defined profile that is considered to be material having a paper-like property may be fed to a paper sorter 31 for sorting paper materials from non-paper materials within the flow of material fed to the optical sorter 51. The non-paper like material may be separated from this flow of material via the optical sorter 51 for feeding to at least one elliptical separator 61 for separating three dimensional (3D) materials like rigid plastics from two dimensional (2D) materials like paper films or thin sheets of material (e.g. materials that have a very low thickness (e.g. a low thickness at or below a pre-selected threshold value) so that the material is classified as a 2D material as compared to a 3D material like a bottle or container etc.). Paper within the 2D material may subsequently be sent to a paper sorter 31 to be separated from the non-paper materials via the paper sorter 31 for sending to a dryer 41 and any paper within the 3D materials may subsequently be sent to a paper sorter 31 for separating the paper material from the non-paper materials via that paper sorter 31. The plastic materials may be further processed to sort the different types of plastic for sorting and recycling of suitable plastics based on the type of plastic that is being separated from the trash for recycling of that plastic material. In some embodiments, the 3D plastic materials may be further sorted for recycling based on plastic composition types while the 2D plastic materials that can be sorted for being sent to a customer who may burn that material as an alternative fuel source. The 2D plastic material may be sorted and shipped as is or sorted, shredded to a desired size range, and then shipped.

The heavy material can be transported to at least one wood sorter 71 for sorting wood material from other material. At least one wood sorter conveyor assembly may transport the material to the wood sorter 71.

The apparatus 100 can also include a drum feeder 17 that is configured to receive recycling materials collected from residential and/or commercial locations via at least one recycling materials transport vehicle. The recycling materials may be passed through a sort line 21 in which the recycling materials may be manually sorted for removing large materials that are easily identifiable from the other materials within the recycling materials. The manually sorted materials that include cardboard, paper materials, and other smaller materials that may not be easily sorted as a large material (e.g. material over 14 inches (35.56 cm), etc.) can also be passed through a cardboard screening device 21*b* so that cardboard is separated from other recycling materials for distributing the cardboard for recycling distribution. Material that is below a pre-selected size range that is not easily manually sorted or identified can be transported from the cardboard screening device 21*b* and/or the sort line 21 that sorted the recycling materials received from the drum feeder 17 to mix these materials with the garbage fed to the first and second size reducer bin assemblies 1 and 3 of the bag opener and/or size reducer assembly 101. The recycling material may be distributed evenly or in some other proportion to feed that material to the first and second size reducer bin assemblies 1 and 3. The feeding of this recycling material to the first and second size reducer bin assemblies 1 and 3 can mix the recycling materials with the garbage for subsequent processing via the different separation devices and other processes.

The paper that is mixed with the garbage can all be relatively wet or otherwise have contaminants that make that paper unsuitable for recycling. Typically, the paper would be considered to have at least an unsuitable moisture content of well over 20% in addition to dirt or other contaminants being present on the paper (either adsorbed and/or absorbed onto the paper). This is particularly true for material in smaller size ranges (e.g. material that is less than 5 inches or less than 12.7 cm in size). After the paper is separated from the garbage via the use of the different separator devices 6 and paper sorters 31, that paper material can be fed to a dryer 41. Prior to being fed to the dryer 41, the paper from different paper sorters 31 and/or size separation lines of the apparatus 100 may be mixed together and passed through at least one size reduction mechanism that may be configured to cut or otherwise process the paper to within a pre-selected size range prior to being fed to the dryer 41. The paper fed to the dryer 41 may subsequently be dried in the dryer until that moisture content of the paper is below a pre-selected threshold, such as under 20% or at or under 20%. The dryer can operate at a temperature during drying operations that is greater than ambient temperature but is also below the incineration temperature, or combustion temperature, of paper. For example, the dryer may heat the paper to no more than 400° F. (204.44° C.), less than 400° F. (204.44° C.) and greater than 100° F. (37.78° C.), or between 250° F.-400° F. (121.11° C.-204.44° C.) for a pre-selected time period (e.g. a residence time of at least 30 minutes (mins), at least 60 mins, at least 120 mins, at least 300 mins, etc.) until the paper fed therein would be expected to be or is sensed to be via at least one sensor under the pre-selected moisture threshold. The sensing of the moisture content of the paper can be determined via at least one sensor 86 within the chamber 41*c* (e.g. as shown in broken line in FIG. 4) and/or at least one sensor that may sense the water content (e.g. water vapor content) within an exhaust flow of gas of the dryer 41. Of course, other embodiments may utilize other types of paper moisture detection mechanisms.

While the paper is being heated in the dryer, it may also be moved within the dryer. The combination of the heating of the paper with the movement of the paper can result in the paper being cleaned of contaminants such as dirt, grime, etc. so that in addition to the moisture of the paper being reduced, contaminants are also removed from the paper. The dryer can be configured so that the contaminants that are removed from the paper are moved out of the dryer via holes 48 in a grate 48*a* the help define the chamber 41*c* of the dryer during the operation of the dryer. The holes can be sized so that paper is retained in the chamber 41*c* while the smaller contaminants separated from the paper can pass through the holes 48 to exit the chamber 41*c* as the paper is moved within the chamber 41*c* of the dryer 41. The cleaned and dried paper that is output from the dryer 41 can be suitable for recycling. This paper may then be mixed with other cleaner paper sorted in the sort line 21 from the recycling materials received via the drum feeder 17 for distribution to a paper product manufacturer for recycling of that paper for use in forming a new paper product (e.g. cardboard, paper plates, paper sheets, construction paper, etc.). Depending on the paper product manufacturer, the paper may be baled via a baler 81 prior to sending the paper to the paper product manufacturer.

The dryer 41 can be configured as a semi-batch or batch process dryer in which the paper fed therein is stored for a pre-selected time period, which may be referred to a residence time, for heating and moving within the dryer. The heated paper that is subsequently cleaned via the dryer operation may then be removed from the dryer 41 prior to new paper material being fed into the dryer. In other embodiments, it is contemplated that the dryer operation can be configured to be utilizable for a continuous flow operation in which the dryer 41 is always heated for heating paper passed therethrough and the paper that is introduced into one end of the dryer 41 is output from an opposite end of the dryer 41 such that the paper being passed through the dryer 41 as it moves toward the outlet of the dryer for drying of the paper is within the dryer 41 for the pre-selected residence time.

Figure 3:
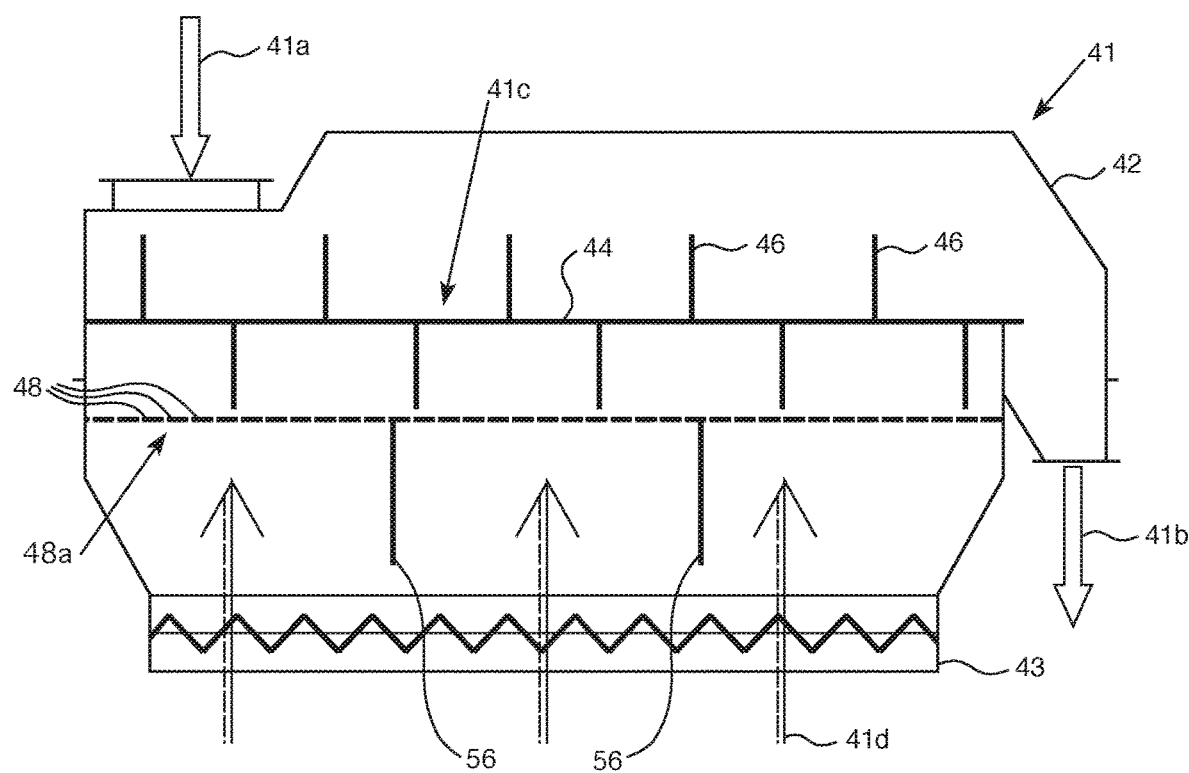
FIG. 3 is a schematic drawing of a first exemplary paper dryer that can be utilized in the first exemplary embodiment of the method and the first exemplary embodiment of the apparatus for sorting trash for paper recycling.
Figure 4:
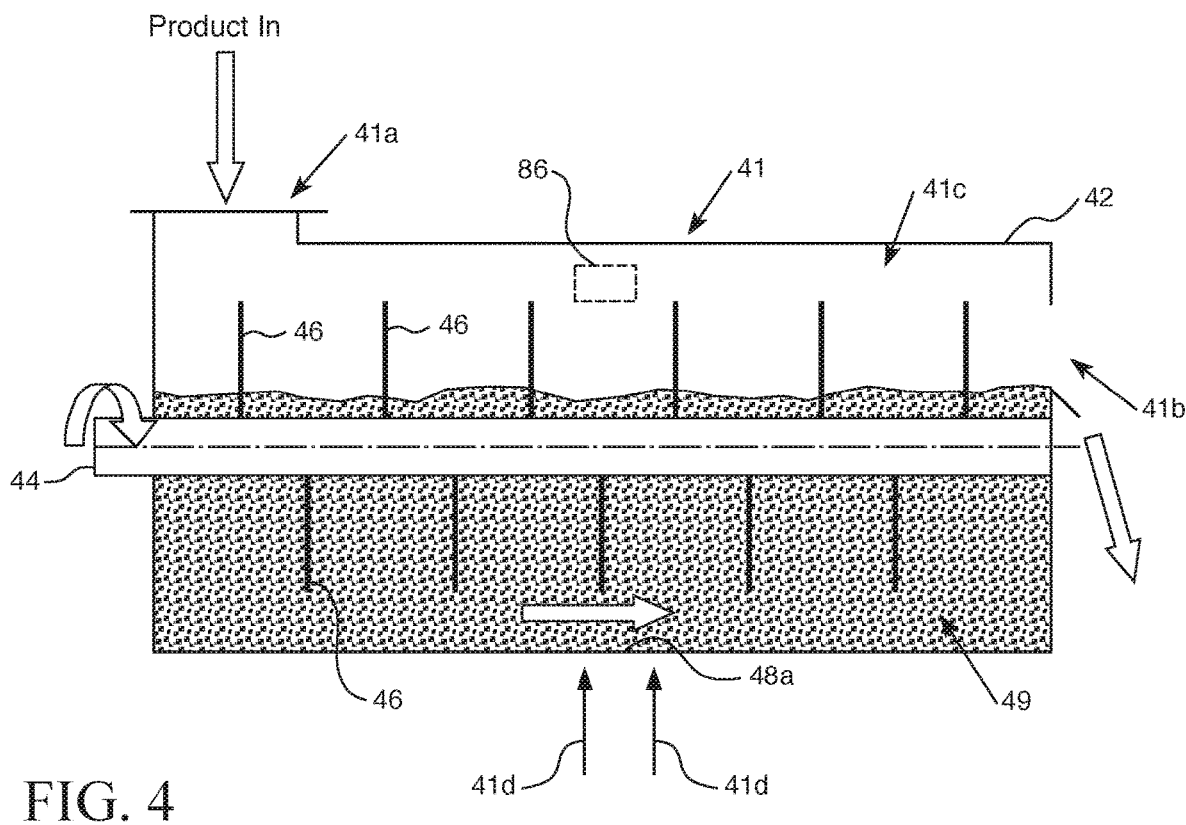
FIG. 4 is a schematic drawing of the first exemplary paper dryer that can be utilized in the first exemplary embodiment of the method and the first exemplary embodiment of the apparatus for sorting trash for paper recycling.
Figure 5:
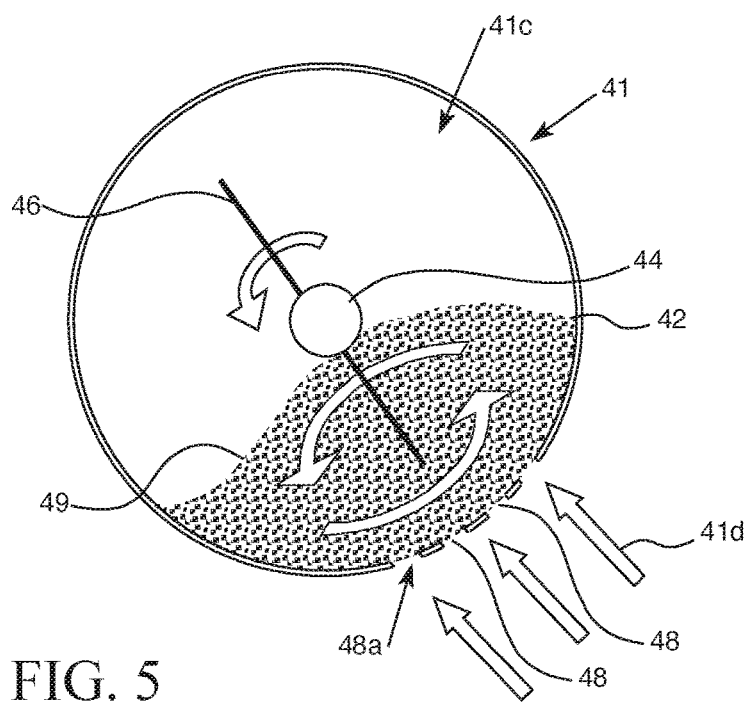
FIG. 5 is a schematic drawing of the first exemplary paper dryer that can be utilized in the first exemplary embodiment of the method and the first exemplary embodiment of the apparatus for sorting trash for paper recycling.

Referring to FIGS. 3-5, an exemplary embodiment of the dryer 41 can include an inlet 41*a* through which paper material is fed into the dryer, an outlet 41*b* through which dried paper is output from the dryer 41, and an internal chamber 41*c* within a housing 42 of the dryer that defines the space within the dryer 41 in which the paper is retained for heating (and drying) of the paper. The dryer 41 can also include at least one rotatable shaft 44 that is positioned within the chamber 41*c*. A plurality of arms 46, which may be structured as paddles, fins, agitator blades, vanes, or other type of mixing structure can be attached to the shaft 44 or be formed on the shaft 44 to extend from a central elongated body of the shaft 44 within the chamber 41*c*. The shaft 44 may be rotated to move the arms 46 for agitating the paper 49 inside the chamber 41c. The motion of the paper may help facilitate convection within the chamber to help improve the efficiency of the heat transfer within the dryer 41 for heating of the paper. The motion of the paper driven by the rotating arms can also help knock dirt, grime, or other contaminants that may be adhered onto the paper off of the paper to clean the paper during drying operations. A portion of the structure that at least helps to partially define the chamber 41c (e.g. a sidewall or floor or other structure that helps define the chamber 41c of the dryer 41) can include or define a grate 48a that has a plurality of holes 48 that are in fluid communication with a conduit through which heated air may pass into the chamber 41c within the housing 42. The heated air 41d can be passed through the holes 48 of the grate 48a and into the chamber 41c for heating the paper and facilitating motion of the paper within the dryer 41 (in combination with motion of the arms 46). The dryer 41 can also include a control valve to control the pressure within the dryer 41 so that exhaust can be output from the dryer 41 during its operation as hotter air is passed into the dryer 41 via the grate 48a. The holes 48 of the grate 48a can also permit grime or dirt that may be knocked off the paper to fall out of the dryer 41 via the holes 48 in the grate 48a while the hot air is passed through those holes for heating the dryer 41 and/or when the hot air is no longer being passed through the holes 48 of the grate 48a. The holes 48 can be sized to be small enough to retain the paper in the chamber 41c while being large enough to permit the dirt and/or grime to pass out of the chamber via the holes 48. The dirt can exit out of the holes while the hot are is passed through the holes and/or when the hot air is not passed through the holes 48 but while the chamber 41c of the dryer 41 is heated via the hot air that had been fed into the chamber 41c. For instance, during heating of the paper, some grime or dirt may pass out of the chamber 41c via the holes 48 in the grate 48a as the hot air being sent through the holes and into the chamber 41c can be fed at a low enough pressure into the chamber 41c of the dryer 41 to permit the contaminants to pass through the holes 48 of the grate 48a countercurrent to the flow of the heated air into the chamber 41c while the heated air is being passed through the holes and into the chamber 41c.

In some embodiments, the dryer may also be configured to continue to rotate the arms 46 even after hot air is no longer being passed into the chamber 41c for a pre-selected period of time to continue drying operations and/or to further agitate the paper to help facilitate the removal of dirt, grime, or other contaminants that may have been adhered onto the paper so that these contaminants may continue to be passed out of the chamber 41c via the holes 48 of the grate 48a even after the heated air is no longer being fed into the chamber 41c of the dryer 41. In some semi-batch or batch type operational arrangements, the dirt and grime can be output by operations of the dryer 41 after the cleaned and heated paper is output from the dryer and before new dirty paper is fed into the dryer via operation of the dryer or use of a dirt removal mechanism (e.g. application of a vacuum, fan or pump to the chamber 41c to remove the dirt etc.).

As can be seen in FIG. 3, the dryer 41 can be configured to include an air heating device 43 such as a heat exchanger or a heater. For example, the heating device 43 can be a burner that may burn a fossil fuel (e.g. natural gas, coal, etc.). As another example, the heating device 43 may be configured so that heat received from a hot fluid from at least one other process of the apparatus 100 is passed through the heating device 43 for transferring that heat to the air passing through the conduit prior to that heated air passing through the holes 48 of the grate 48a and into the chamber 41c. In some embodiments, the heating device 43 may receive hot exhaust gas from at least one generator of the plant for heating air prior to feeding that air into the chamber 41c. In other embodiments, the heating device 43 may be configured as a direct contact heater that is configured to feed the hot exhaust gas from at least one plant process into the chamber 41c for heating the paper within the chamber 41c.

In some embodiments, the hot exhaust gas fed to the dryer 41 can be exhaust gas from a generator apparatus 91 or other element of an anaerobic digestion process of the apparatus 100 that may be configured to capture methane from waste organic material for combustion of that methane. The generator apparatus 91 can be configured to include a combustor that receives the methane from the organic waste digestion process or any other waste conversion process that generates waste heat (e.g. hot exhaust gas, hot exhaust fluid, etc.) to combust that methane for heating water to form steam for driving one or more turbines to power at least one generator. The hot exhaust gases from the combustor that exit a heat exchanger for heating steam that may be fed to a turbine can be output to the heating device 43 of the dryer via an exhaust gas conduit 93 connected between the generator apparatus 91 and the dryer 41. In some embodiments, the heater device 43 can be within the housing 42 of the dryer. In other embodiments, the heater device 43 may be in fluid communication with the housing 42 of the dryer for feeding hot gas to the dryer for supplying hot gas to the dryer for use in heating the paper within the chamber 41c via a dryer conduit 56 connected to the exhaust gas conduit 93.

It should be understood that one or more valves, pumps, and/or fans can be included within the one or more conduits connected between the generator apparatus 91 and the dryer 41 to facilitate the feeding of the hot exhaust gas to the dryer 41 at a pre-selected flow rate, temperature, and/or pressure. There may also be one or more sensors 86 coupled to the one or more conduits for monitoring operations of the flow of exhaust gases and a controller connected to the valves, sensors and other elements for controlling valve positions and pump or fan operations so that the flow of heated gas fed to the dryer is controlled so that operations of the dryer occur within a set of pre-defined operating parameters (e.g. temperature and pressure set points, etc.).

After the paper is heated within the dryer 41 for a pre-selected time period and/or at least one sensor senses a condition that indicates the paper heated in the dryer 41 has been dried so that its moisture content is below a pre-selected moisture range (e.g. below 20% moisture content, at or below a 20% moisture content, etc.), the dryer may be stopped and the paper may be output from the chamber 41c via at least one outlet 41b. New paper that requires drying may then be fed into the dryer for drying of that paper.

It should be appreciated that for batch or semi-batch dryer operations, the inlet 41a and outlet 41b of the dryer may be closed during drying operations. The inlet may be opened for feeding paper into the chamber 41c and the outlet 41b may be opened for outputting the dried paper from the chamber 41c. For dryers that may be configured for continuous operations, it should be appreciated that the inlet and outlet may be opened during dryer operations and that paper that needs to be dried may be fed into the dryer 41 as sufficiently dried and cleaned paper is output from the dryer 41.

It should be appreciated that other modifications of the method and apparatus for sorting trash for paper recycling may be made to meet different sets of design criteria. For instance, embodiments of the apparatus 100 can include sorting and separation devices for sorting relatively two-dimensional plastic materials (e.g. sheets and films) from three-dimensional materials (e.g. bottles, canisters, etc.). The two-dimensional materials (e.g. the relatively flat or thin materials that are less than a pre-selected thickness) can be collected for distribution and/or shredded for distribution to an end user as an alternative fuel source. The three dimensional materials (e.g. the plastic materials that are greater than a pre-selected thickness), can be further separated and sorted based on polymeric composition (e.g. polyethylene, polystyrene, polypropylene, etc.) for further recycling (e.g. distributing to a plastic bottler or other plastic manufacturer who may melt the solid polymeric material and subsequently reuse the material for forming a new plastic structure). As another example, embodiments of the apparatus 100 can include multiple different magnetic separator mechanisms that are configured to pass a magnetic field through a flow of trash for collecting ferromagnetic materials for separation of those materials from the trash and sorting such materials for recycling of those materials. Embodiments of the apparatus 100 may also use one or more other sorter mechanisms for separating non-ferrous and ferrous metals, aluminum, and other types of material from the garbage for sending those materials to other customers who may utilize those waste materials such that the materials are recycled instead of being deposited into a landfill. Wood or other materials may also be sorted from the trash for distribution to another customer for re-use of that material so that the sorted and separated wood or other material does not have to be deposited in a landfill.

As another example, it should be appreciated that embodiments of the apparatus 100 can utilize any number or arrangement of material conveying devices for conveying materials between different units of the apparatus such as conveyors, conduits, or other types of material transport mechanisms. It is also contemplated that one or more transport vehicles (e.g. forklifts, trucks, etc.) may be used to haul materials within the plant from one device to another. For instance, paper may be output from the dryer 41 and put onto a bin for being transported via forklift or other vehicle to a baler 81 for feeding the paper into the baler 81 for baling of the paper. The baled paper may then be moved onto a truck for delivery to a customer via use of pallets and forklifts or other vehicles.

As yet another example, it should be understood that embodiments of the apparatus 100 can be configured to utilize any number and type of sensors that may be coupled to one or more controllers for controlling operations of the apparatus and/or monitoring operations of the apparatus. Temperature sensors, pressure sensors, flow sensors, size sensors, weight sensors, detectors, and other types of sensors may be communicatively connected to one or more controllers for monitoring and/or controlling apparatus operations. Each controller can be an electronic device (e.g. a computer device) that includes hardware. The controller can have a processor communicatively connected to non-transitory memory and at least one transceiver for communications with sensors to monitor operations of the apparatus and communications with elements of the apparatus to adjust operational parameters of different elements based on measured operational parameters (temperature, pressure, trash flow rate, a detected blockage, etc.). The memory of the controller can have one or more programs stored thereon that define a method of monitoring and/or controlling operations that is performed by the controller when the processor runs the program. The controller can also be communicatively connected to a work station for outputting data to an operator to facilitate operator control of one or more mechanisms of the apparatus 100.

As yet another example, it should be appreciated that different operational parameters for the apparatus 100 can be utilized than what is explicitly mentioned herein. For instance, the size ranges discussed herein (e.g. the first, the second, the third, the fourth, the fifth, the sixth, and the seventh size ranges) can be varied to meet a particular set of design criteria. Any of these size ranges may be selected to be a suitable size range and need not be one of the specific exemplary size ranges for that size range that is identified explicitly herein. As another example, the dryer 41 can operate at other residence times, temperatures, or other process parameters than those explicitly mentioned herein. For instance, the residence time and temperature ranges for the dryer 41 can be any suitable selected time and temperature that may meet a desired set of design criteria. As yet another example, the moisture content threshold can be based on a wet basis measurement or a dry basis measurement and can be based on weight percent or other type of content metric (e.g. molar, volumetric, etc.). As yet another example, the hot air fed to the dryer or used to dry the paper in the dryer 41 can be a gas having any number of different compositions such as a gas that is heated air from the environment external to the dryer, a mixture of carbon dioxide and nitrogen, a flue gas emitted from a combustor, a hot gaseous fluid output from a generator apparatus 91, etc. Thus, while certain exemplary embodiments of the apparatus for sorting trash for paper recycling and methods of making and using the same have been shown and described above, it is to be distinctly understood that the invention is not limited thereto but may be otherwise variously embodied and practiced within the scope of the following claims.

What is claimed is:

1. A garbage processing apparatus comprising:
   at least one dryer having a chamber configured to receive paper sorted from garbage to heat the paper so a moisture content of the paper is reduced to a level that is at or below a pre-selected threshold;
   a sensor positioned to measure the moisture content of the paper in the chamber;
   a controller connected to the sensor and other elements to control operations of the at least one dryer so that a flow of heated gas fed to the dryer is controlled;
   wherein the chamber of the dryer is sized and configured to agitate the paper so that the paper is cleanable as the paper is heated within the chamber;
   wherein the dryer is also comprised of a grate, the grate having holes in communication with the chamber sized and configured so that hot air is passable into the chamber via the holes for heating and cleaning the paper and dirt that is removed from the paper as the paper is heated in the chamber is also passable through the holes for exiting the chamber of the dryer.

2. The apparatus of claim 1, wherein the apparatus is configured as a garbage processing plant.

3. The apparatus of claim 1, wherein the dryer has at least one moveable shaft connected to the at least one arm.

4. The apparatus of claim 3, wherein the at least one moveable shaft is a rotatable shaft and the at least one arm is a plurality of arms positioned in the chamber to move to agitate the paper in the chamber via rotation of the rotatable shaft.

5. The apparatus of claim 1, wherein the dryer is connected to at least one generator apparatus to receive exhaust gas from the generator apparatus to heat the paper.

6. The apparatus of claim 1, wherein the dryer is configured so that drying of the paper is performed at a temperature that is no greater than 400° F.

7. The apparatus of claim 6, wherein the dryer is configured so that drying of the paper is performed at a temperature that is between 250° F. -400° F.

8. The apparatus of claim 1, wherein the sensor is configured to monitor the moisture content to the pre-selected threshold.

9. The apparatus of claim 8, wherein the pre-selected threshold is 20%, 18%, 15%, 12% or a value between 20% and 12%.

10. A method of sorting trash for recycling paper within the trash comprising:
separating paper from garbage; and
drying the paper separated from the garbage in at least one dryer to heat and clean the paper, each of the at least one dryer having a chamber configured to receive the paper sorted from the garbage to heat the paper to reduce the moisture content of the paper to a level that is at or below a pre-selected threshold, wherein the dryer is comprised of a grate, the grate having holes in communication with the chamber so that hot air is passable into the chamber via the holes for heating the paper and dirt that is removed from the paper as the paper is heated in the chamber is also passable through the holes for exiting the chamber of the dryer;
controlling the drying of the paper via a controller connected to the sensor and other elements to control operations of the at least one dryer; and
wherein the drying of the paper is performed such that the paper is agitated during the drying to clean the paper during the drying.

11. The method of claim 10, wherein the dryer is comprised of at least one arm that is moveable within the chamber of the dryer to agitate the paper as the paper is heated and the dryer is configured to clean the paper as the paper is heated therein.

12. The method of claim 10, comprising:
baling the paper after it is dried.

13. The method of claim 11, comprising: passing exhaust from a generator apparatus into the chamber via the holes of the grate to heat the paper while the contaminants are passed out of the chamber via the holes of the grate.

14. The method of claim 13, wherein the pre-selected threshold is 20%, 18%, 15%, 12% or a value between 20% and 12%.

15. The method of claim 10, wherein the drying of the paper also removes contaminants absorbed in the paper.

16. The method of claim 10, comprising:
feeding exhaust gas from at least one plant process to the dryer for use in heating the paper for drying and cleaning the paper.

17. The method of claim 10, wherein the at least one arm is a plurality of arms and the dryer has at least one rotatable shaft connected to the plurality of arms that move within the chamber of the dryer for agitating the paper within the chamber while the paper is heated for drying and cleaning the paper.

18. The method of claim 10, wherein the drying of the paper is performed at a temperature that is no greater than 400° F.

19. The method of claim 18, wherein the drying of the paper is performed at a temperature that between 250° F. -400° F.

20. A method of sorting trash for recycling paper within the trash comprising:
separating paper from garbage;
utilizing multiple separators to separate the garbage and paper mixed therein into different flows of garbage having different size ranges such that:
a separator separates the garbage and paper mixed therein into a first flow of garbage and paper mixed therein that has a first size range and a second flow of garbage and paper mixed therein that has a second size range that differs from the first size range,
a second separator separates the first flow of garbage and paper mixed therein having the first size range into a third flow of garbage and paper mixed therein having a third size range and a fourth flow of garbage and paper mixed therein having a fourth size range that is different from the third size range;
processing the third flow of garbage and paper mixed therein to separate paper from the garbage of the third flow for feeding the paper separated from the third flow to a dryer, and
processing the fourth flow of garbage and paper mixed therein to separate paper from the garbage of the fourth flow for feeding the paper separated from the fourth flow to the dryer, and
feeding the separated paper to the dryer so that the paper separated from the third flow and the paper separated from the fourth flow is fed to the dryer; and
drying the paper in the dryer so that a moisture content of the paper is below a pre-selected threshold such that the drying of the paper within a chamber of the dryer removes contaminants adhered to the paper to clean the paper during the drying so that contaminants removed from the paper as the paper is dried in the chamber pass out of the chamber of the dryer in which the paper is dried via holes of a grate that are in communication with the chamber;
controlling the drying of the paper via a controller connected to the sensor and other elements to control operations of the at least one dryer; and
wherein the drying of the paper is performed such that the paper is agitated during the drying to clean the paper during the drying.

* * * * *